April 2, 1963 L. PROSIN 3,083,927

SPINDLE

Filed May 13, 1960 2 Sheets-Sheet 1

INVENTOR.
LOUIS PROSIN
BY George Sullivan
Agent

April 2, 1963 L. PROSIN 3,083,927

SPINDLE

Filed May 13, 1960 2 Sheets-Sheet 2

INVENTOR.
LOUIS PROSIN

BY George C. Sullivan
Agent

United States Patent Office 3,083,927

Patented Apr. 2, 1963

3,083,927
SPINDLE

Louis Prosin, Los Angeles, Calif., assignor to Lockheed Aircraft Corporation, Burbank, Calif.

Filed May 13, 1960, Ser. No. 28,899
6 Claims. (Cl. 242—68.3)

This invention relates to a spindle on which a reel may be mounted. More particularly it relates to a spindle having means to accommodate reels of varied thicknesses.

The spindle of the present invention has the major purpose of driving a reel which fits over the spindle to wind or pay out a strand or web to or from the reel. In many such uses such as in a tape recorder, the spindle which holds the tape reel must have means to accurately locate the reel on the spindle. A channel of information must be accurately placed on the tape. During readout of that information, the recorded channel must be accurately presented to the playback head. Accuracy in recording or playback requires accurate location of the reel on the spindle. This is especially true where multiple closely spaced channels are recorded on a tape. It is advantageous in some instances to use different width tapes. In multiple channel recording, it is desirable to use the central group of channels as common to all widths of tape. In other words, the center line of the tape must always lie in the same plane in relation to a stack of heads regardless of its width. If the driving spindle is fixed in relation to the recording or playback heads, there is required some means to fix the centerline of the tape reel in relation to the spindle.

An object of this invention is to provide a spindle having means to accurately locate a reel thereon so as to provide accurate correlation between recording and playback channels.

It is another object of this invention to provide a spindle having means to accommodate reels of varied widths or thicknesses.

It is another object of this invention to provide a spindle having means to locate a reel thereon so that the centerline of web material carried thereon always approaches or departs the spindle in the same plane regardless of its width. A fixed flange is provided on one end of the spindle for a seat for the widest reel which can be accommodated. Shelf means extendable beyond the diameter of the spindle between the plane of departure and the flange one-half the difference in width between the maximum width reel and the reel of a smaller width are provided for the narrower reels.

It is another object of this invention to provide a unique shelf extension means for a tape spindle. A resilient member of a cloverleaf shape is provided adjacent the flange on one end of the spindle. In its relaxed position its exterior diameter is less than the exterior diameter of the spindle. Cam means are provided to extend it beyond the walls of the spindle so that a reel having a through aperture to fit around the spindle will rest upon the resilient shelf member which is extended beyond the diameter of the spindle.

It is another object of this invention to provide an accurate centering means for a reel about the central axis of a spindle. A resilient O-ring provided about the spindle above the reel is forced uniformly outwardly and downwardly against the reel to cause it to center about the central axis of the spindle. The resilient O-ring additionally provides a firm frictional contact between the spindle and the reel to prevent relative rotation for firm traction.

It is another object of this invention to provide a plurality of means on either side of a central transverse plane on a spindle to prevent axial movement of a reel thereon. The flange and a relative O-ring equidistant from central plane provide lateral movement prevention means for the widest of reels while an interposed shelf and a second O-ring which are spaced equidistant from the plane but between the outer O-ring and the flange provide lateral prevention of movement means for a narrower reel.

Further advantages and objects of the invention will become apparent from the reading of the specification which follows especially when taken in conjunction with the appended drawings wherein like numerals indicate like elements.

Figure 1:
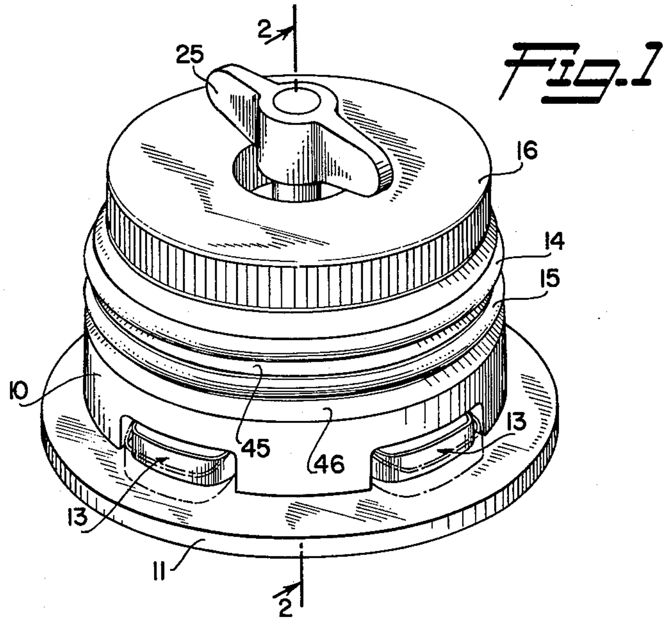
FIGURE 1 is a perspective of the spindle.

FIGURE 1 is perspective of the spindle showing the hub 10 over which the reel, not shown in FIGURE 1, will sit against either the flange 11 or the resilient member 13 when it is extended into the dotted line position. The resilient O-rings 14 and 15 are expanded and moved down against the reel by turning the knurled knob 16.

Figure 2:
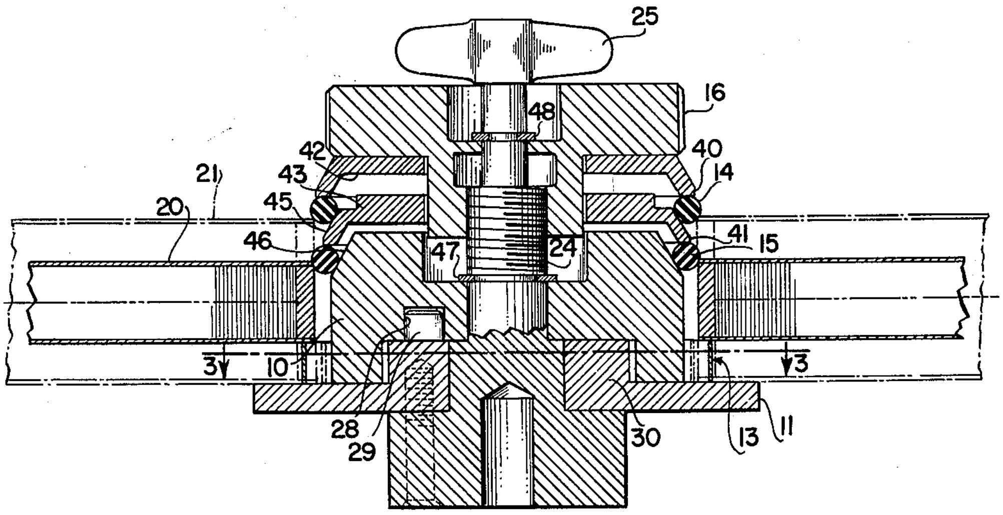
FIGURE 2 is a cross sectional view taken from lines 2—2 of FIGURE 1.
Figures 3, 4, 5:
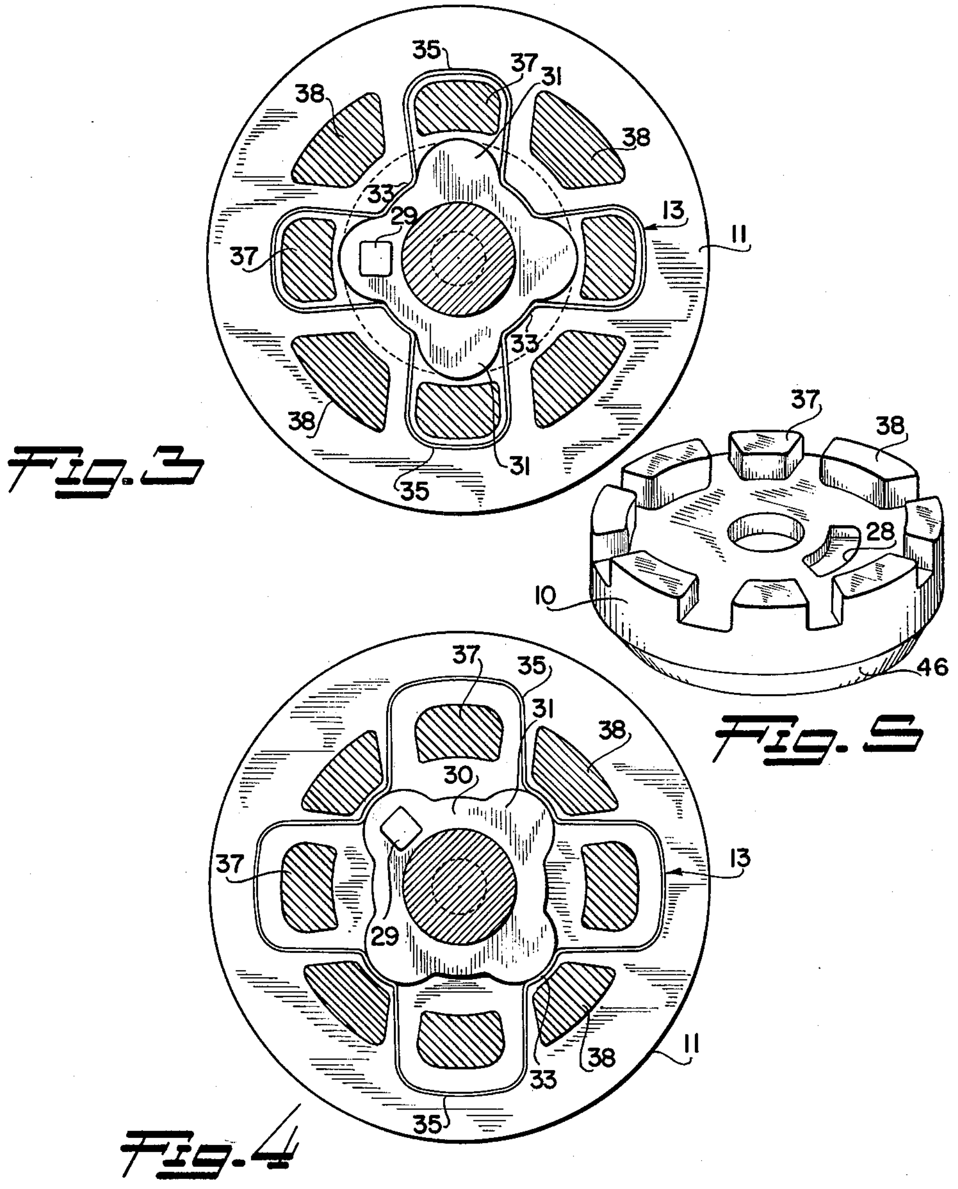
FIGURE 3 is a section taken off line 3—3 of FIGURE 2 showing the cloverleaf resilient member in its relaxed or retracted position.
FIGURE 4 is a view of FIGURE 3 showing the cam means which extend the resilient cloverleaf member beyond the circumeference of the hub to provide a shelf for a narrow reel.
FIGURE 5 is a perspective of the hub member shown in FIGURE 3 but inverted.

A narrow width reel is shown in full lines at 20 in FIGURE 2. A wide reel 21 is shown in dotted lines. These are generally one-half and full inch reels in the art but can be of any relative widths within the scope of the invention. Each reel has a central aperture which has substantially the same diameter as that of hub 10. The resilient member 13 is constructed of a spring steel strap so that in its relaxed position it will occupy a space as shown by the full line position in FIGURE 1 so that its exterior diameter is therefore slightly larger than that of the hub 10. The full line extended position is shown supporting the narrower reel in FIGURE 2. As can be seen in FIGURES 3 and 4, the shelf member 13 is set on edge to support the reel.

The flange 11 is fixed to vertical shaft 24 the bottom of which has an enlarged member for connection with driving means for the reeling operations. The vertical shaft 24 may be rotated by means of the wing member 25. Limited relative motion between hub 10 and the shaft 24 is provided by an arcuate slot 28 on the under side of hub 10 in which a stem 29 upstanding from the boss 30 on flange 11 moves. As can be seen from FIGURES 3 and 4, the boss 30 has four equally spaced cam surfaces 31. The resilient member 13 is shaped much like a cloverleaf and has inner parts 33 arcuately shaped which lie against the boss 30 between the cam surfaces 31 in FIGURE 3. When the vertical shaft 24 is turned with respect to the hub 10 by means of the member 25 the cam surfaces 31 ride under the inner arcuately shaped parts 33 of resilient member 13 causing the outer parts 35 of member 13 to be extended beyond the diameter of the hub 10 as shown in FIGURE 4. Legs 37 and 38 extend downwardly from the under side of hub 10 to prevent rotation of the member 13 with the boss 30 and cam surfaces 31.

The one-eighth of a turn of the shaft 24 with respect to shelf member 13 as restrained by hub 10 permitted by stem 29 in arcuate slot 28 is a sufficient amount to move cam surfaces 31 under the arcuate portions 33 of the resilient member 13. Note that the arcuate portions 33 are so shaped that they mate with the cam surfaces 31 so as to prevent inadvertent retraction of shelf member 13.

To extend the shelf member 13, the hub 10 is grasped with one hand and the member 25 turned 45° with the other to cause the cam members 31 to move under the arcuate portion 33 of shelf member 13. To cause shelf member 13 to recede within the diameter of hub 10 the opposite operation is effected. Hub 10 is grasped with the one hand and member 25 is turned 45° in the opposite direction. Where the inertia of the driving mechanism connected to shaft 24 is such that movement of the shaft is restrained, mere rotation of hub 10 will effect extension or retraction of shelf 13. Likewise, restraining of the shaft by holding member 25 and turning hub 10 will effect the same result.

The means to center the reel on the spindle and to provide a frictional connection to prevent relative movement between the spindle and the reel are provided by O-rings 14, 15 and inclined surfaces 45, 46 down which the O-rings are pressed by operation of a knob 16. O-rings 14 and 15 are pressed downwardly by skirts 40 and 41 of discs 42 and 43 which lie between hub 10 and knob 16. The outwardly extending skirt 41 of disc 43 has inclined surface 45 on which the O-ring 14 is pressed downwardly and expanded outwardly. The upper peripheral edge of hub 10 is beveled to form an incline 46 for the O-ring 15. Note that the O-ring 14 is so placed to contact the upper inner peripheral edge of the central aperture in the wide reel while the O-ring 15 is adapted to contact a smaller or narrower reel in like manner. When a wide reel is utilized, the O-ring 15 will be caused to expand outwardly within the aperture itself instead of at the upper edge.

When it is desired to remove a reel from the spindle the knob 16 is reversed and the O-rings 14 and 15 return to their relaxed shape allowing the reel to be slipped up and over the spindle. Note that axial movement of the hub 10 on shaft 24 is prevented by the washer 47. Another washer 48 is provided to retain the knob 16 on the shaft 24.

In review, when a wide reel 21 is to be carried on the spindle, the resilient shelf member 13 must be retracted within the hub 10 so that the reel may sit upon the flange 11. If member 13 is extended the hub 10 is grasped in one hand and the member 25 turned 45° to the left as viewed in FIGURE 1. This will effect a movement of the cam surfaces 31 from the position shown in FIGURE 4 to that shown in FIGURE 3. Thus, the cam surfaces 31 will be moved from under the arcuate portion 33 of shelf member 13 so that they will lie between the cloverleaf parts 35 as shown in FIGURE 3. The wide reel 21 will be slipped over the spindle after the O-rings 14 and 15 have been returned to their relaxed position by turning the knob 16 to its upper position. When in place the knob 16 will be screwed down causing the skirt 40 of disc 42 to press downwardly on the resilient O-ring 14. O-ring 14 thus will be forced down the incline 45 to expand it against reel 21 with resultant centering of the reel about the vertical axis of the spindle. Firm frictional contact for driving the reel through motive means connected to shaft 24 will also be provided by the O-rings. Removal of reel 21 is effected by a reverse set of steps. The knob 16 will be screwed in the opposite direction to its upper position, thus relaxing the O-rings 14 and 15 permitting the reel 21 to be lifted upward over the spindle.

To adapt the spindle so that a narrower reel 20 will have its center line at the same position on the hub 10 occupied by the center line of the wider reel 21, the resilient shelf member 13 is expanded from the position shown in FIGURE 3 to that shown in FIGURE 4. Cam surfaces 31 will be forced under the arcuate portions 33 of the shelf member 13 by turning member 25 clockwise as seen in FIGURE 1. This will cause the outer parts 35 of shelf member 13 to be extended beyond the diameter of the hub 10. Reel 20 will be slipped over O-rings 14, 15 and hub 10 to rest on shelf 13 and the knob 16 again turned downwardly. The skirt 40 will transmit the force from knob 16 through disc 42 to the resilient O-ring 14. Note that O-ring 14 will not contact the narrower ring 20 but will transmit its force through the incline of disc 43 and its skirt 45 to the O-ring 15 which is then forced downwardly and outwardly to contact the peripheral edge of the aperture of the narrower reel 20 to center it about the spindle and provide a frictional connection between the spindle and the reel. Removal is effected in the same manner as with the wide reel 21.

A simple spindle adapted to accommodate reels of different widths or depths has been described. I claim the following combinations and their equivalents as my invention:

1. A spindle adapted to accommodate reels having varying depth comprised of an axial shaft extending the length of the spindle, a flange fixed to the shaft upon which a reel may rest, an upstanding boss on the flange centered about the shaft, a plurality of cam surfaces spaced equally about the periphery of the boss and extending outwardly from the shaft, a cylindrical hub rotationally and concentrically mounted on the shaft above the boss, a plurality of legs, two for each cam surface, extending downwardly from the lower periphery of the hub and surrounding the boss and its cam surfaces in a spaced relationship, a resilient endless member of a cloverleaf shape having inner and outer parts so that its inner parts lie adjacent the boss and its outer parts around alternate legs on the hub in such a manner that the exterior diameter of the endless member is less than the exterior diameter of the hub, an arcuate groove on the underside of the hub facing the boss, a stem extending upwardly from the boss into the arcuate groove to provide limited relative movement between the boss and the hub, means to rotate the boss relative to the hub so that the cam surfaces on the boss will be forced against the inner parts of the endless member adjacent the boss thereby forcing the outer parts lying adjacent the alternate legs beyond the diameter of the hub to an expanded position to form a shelf for a reel, means to retain this relative position of the hub and the boss, a tapered incline on the upper periphery of the hub, a plurality of discs above the hub having a diameter substantially equal to the hub, each disc terminating in an outwardly extending skirt to provide an incline substantially parallel to that of the hub, a resilient O-ring lying below each disc skirt each having a diameter substantially equal to that of the hub, means to prevent axial movement of the hub on the shaft, a turning knob threaded to the shaft above the hub so that it may be adjusted along the shaft so that when adjusted toward the hub the skirts of each disc will force the resilient O-ring lying below down its incline and outwardly to seat against the central aperture of a reel around the hub.

2. A spindle adapted to accommodate reels of varied depths, comprised of a hub over which the reel will sit, a flange extending outwardly from the hub providing a seat for a reel, means to interpose a shelf comprised of an endless cloverleaf radially expandable member above the flange on which a relatively narrow reel may sit, and means to clamp the reel to the spindle.

3. A spindle to accommodate reels of varied thickness comprised of a hub having a longitudinal axis, a plane intermediate the ends of the hub perpendicular to the axis of any reel regardless of reel thickness, means to center the reel about the axis of the hub, endless resilient and radially expandable cloverleaf shaped means on the hub to locate the center line of the reel at the plane on the hub and means to prevent relative rotation between the reel and the hub.

4. A spindle adapted to accommodate reels having varying depth comprised of an axial shaft extending the length of the spindle, a flange fixed to the shaft upon which a reel may rest, an upstanding boss on the flange centered about the shaft, a plurality of cam surfaces spaced equally about the periphery of the boss and extending outwardly from the shaft, a cylindircal hub rotationally and concentrically mounted on the shaft above the boss, a plurality of legs, two for each cam surface, extending downwardly from the lower periphery of the hub and surrounding the boss and its cam surfaces in a spaced relationship, a resilient endless member of a cloverleaf shape having inner and outer parts so that its inner parts lie adjacent the boss and its outer parts around alternate legs on the hub in such a manner that the exterior diameter of the endless member is less than the exterior diameter of the hub, means to rotate the boss relative to the hub so that the cam surfaces on the boss will be forced against the inner parts of the endless member adjacent the boss thereby forcing the outer parts lying adjacent the alternate legs beyond the diameter of the hub to an expanded position to form a shelf for a reel, means to retain this relative position of the hub and the boss.

5. A spindle adapted to accommodate reels having varying depth comprised of an axial shaft extending the length of the spindle, a flange fixed to the shaft upon which a reel may rest, an upstanding boss on the flange centered about the shaft, a plurality of cam surfaces spaced equally about the periphery of the boss and extending outwardly from the shaft, a cylindrical hub rotationally and concentrically mounted on the shaft above the boss, a plurality of legs, two for each cam surface, extending downwardly from the lower periphery of the hub and surrounding the boss and its cam surfaces in a spaced relationship, a resilient endless member of a cloverleaf shape having inner and outer parts so that its inner parts lie adjacent the boss and is outer parts around alternate legs on the hub in such a manner that the exterior diameter of the endless member is less than the exterior diameter of the hub, means to rotate the boss relative to the hub so that the cam surfaces on the boss will be forced against the inner parts of the endless member adjacent the boss thereby forcing the outer parts lying adjacent the alternate legs beyond the diameter of the hub to an expanded position to form a shelf for a reel, means to retain this relative position of the hub and the boss, a plurality of discs above the hub each having a diameter substantially equal to that of the hub, a resilient O-ring lying between each of the discs and the hub having a diameter substantially equal to that of the hub, a turning knob threaded to the shaft above the hub so that it may be adjusted along the shaft so that when adjusted toward the hub each disc will force the resilient O-ring lying adjacent thereto outwardly to seat against the central aperture of a reel around the hub.

6. A spindle adapted to accommodate reels having varying depth comprised of an axial shaft extending the length of the spindle, a flange fixed to the shaft upon which a reel may rest, an upstanding boss on the flange centered about the shaft, a plurality of cam surfaces spaced equally about the periphery of the boss and extending outwardly from the shaft, a cylindrical hub rotationally and concentrically mounted on the shaft above the boss, a plurality of legs, two for each cam surface, extending downwardly from the lower periphery of the hub and surrounding the boss and its cam surfaces in a spaced relationship, a resilient endless member of a cloverleaf shape having inner and outer parts so that its inner parts lie adjacent the boss and its outer parts around alternate legs on the hub in such a manner that the exterior diameter of the endless member is less than the exterior diameter of the hub, means to rotate the boss relative to the hub so that the cam surfaces on the boss will be forced against the inner parts of the endless member adjacent the boss thereby forcing the outer parts lying adjacent the alternate legs beyond the diameter of the hub to an expanded position to form a shelf for a reel, means to retain this relative position of the hub and the boss, a tapered incline on the upper periphery of the hub, a plurality of discs above the hub having a diameter substantially equal to the hub, each disc terminating in an outwardly extending skirt to provide an incline substantially parallel to that of the hub, a resilient O-ring lying below each disc skirt each having a diameter substantially equal to that of the hub, means to prevent axial movement of the hub on the shaft, a turning knob threaded to the shaft above the hub so that it may be adjusted along the shaft so that when adjusted toward the hub the skirts of each disc will force the resilient O-ring lying below down its incline and outwardly to seat against the central aperture of a reel around the hub.

References Cited in the file of this patent

UNITED STATES PATENTS

| | | |
|---|---|---|
| 2,381,535 | Gemmel | Aug. 7, 1945 |
| 2,537,263 | Fogle | Jan. 9, 1951 |
| 2,960,278 | Tronslin | Nov. 15, 1960 |